United States Patent Office 2,810,723
Patented Oct. 22, 1957

2,810,723

LYSERGIC ACID DERIVATIVES ACYLATED AT THE INDOL NITROGEN

Arthur Stoll, Arlesheim, Basel-Land, Albert Hofmann, Bottmingen, Basel-Land, and Franz Troxler, Basel, Switzerland, assignors, by mesne assignments, to Saul & Co., Newark, N. J., as nominee of Fidelity Union Trust Company, executive trustee under Sandoz trust No Drawing. Application December 22, 1955, Serial No. 554,632

Claims priority, application Switzerland December 24, 1954

8 Claims. (Cl. 260—285.5)

The present invention relates to derivatives of the lysergic acid series, which derivatives are acylated at the indol nitrogen and correspond to the formula

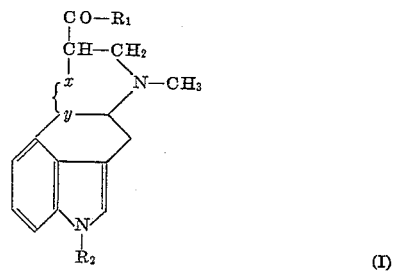

wherein $R_1$ represents lower alkoxy (e. g. methoxy, ethoxy, propoxy, butoxy, etc.), lower monoalkylamino (e. g. monomethylamino, monoethylamino, monopropylamino, monobutylamino, etc.) or lower dialkylamino (e. g. dimethylamino, diethylamino, dipropylamino, dibutylamino, etc.), $R_2$ represents —$COCH_3$ or —$COCH_2COCH_3$, and $\underbrace{x \quad y}$ represents —$CH_2$—$CH<$ (dihydrolysergic acid derivatives) or —$CH=C<$ (lysergic acid derivatives).

The invention relates further to a process for the preparation of the aforesaid compounds of Formula I. According to the process of this invention, the corresponding lysergic acid derivative of the formula

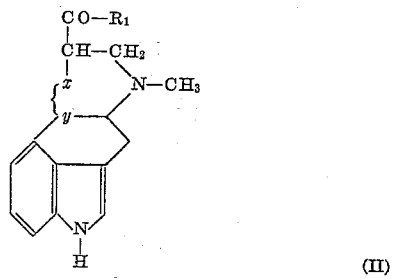

wherein $R_1$ and $\underbrace{x \quad y}$ have the afore-recited significances, is treated with gaseous ketene in a suitable solvent medium, and in some cases in the presence in the said medium of a tertiary base as catalyst.

The art literature has not heretofore described any acylation products of lysergic acid or of simple lysergic acid derivatives. Conventional acylating agents can not introduce an acyl group into the lysergic acid molecule. Such acylating agents, as for example acetic anhydride or acetyl chloride, do not react under mild conditions. If for instance the temperature be raised in an effort to force the reaction to proceed, then fundamental changes in the lysergic acid molecule take place, and the greater part of this very sensitive molecule is destroyed. Thus, if for example lysergic acid or dihydrolysergic acid is heated with acetic anhydride, a far-reaching conversion of the molecule takes place. The nitrogen-containing ring D is split, and a lactam is formed in a secondary reaction, but no acetylation results.

A primary object of the present invention is the embodiment of a process for the acylation of lysergic acid derivatives at the indol nitrogen and thus to render available the resultant indol nitrogen-acylated products. This object is realized by the process hereinbefore set forth. Such process may be carried out, for example, by dissolving a lysergic acid derivative of Formula II in a suitable solvent, and then passing a stream of ketene through the solution. The reaction mixture is worked up, after which the reaction product is chromatographically purified.

The lysergic acid derivatives of Formula II employed as starting material in the present invention can be prepared for example according to A. Stoll and A. Hofmann [Helv. Chim. Acta 26, 944 (1943)] or according to A. Stoll, J. Rutschmann and W. Schlientz [Helv. Chim. Acta 33, 375 (1950)].

Suitable solvents, in the sense of the foregoing, are benzene, toluene, acetone and other organic compounds which do not react with ketene. In non-polar solvents, such for example as benzene, only acetyl derivatives result; in acetone on the other hand acetoacetyl derivatives are formed in addition to acetyl derivatives as a result of partial polymerization of the ketene.

In non-polar solvents, it is advantageous to add a catalytic quantity of a tertiary base, such as trimethylamine or the like, whereby a smoothly proceeding acetylation reaction results. In polar solvents, such for instance as acetone, the basicity of the compound to be acylated suffices for the smooth course of the reaction. The reaction proceeds without supplying heat from the exterior, and with slight generation of heat.

In the course of the treatment with the ketene, such ketene-polymerization products as may form are readily separable from the desired acylation products of the lysergic acid series by taking advantage of the basic character of the last-named products.

The new 1-acyl derivatives of the lysergic acid series thus provided by the present invention are well-crystallizing compounds which form crystalline salts. They are readily distinguishable from the starting compounds by means of the Keller color reaction. Whereas the non-acylated derivatives of lysergic acid and dihydrolysergic acid instantaneously give the typical blue coloration when shaken with glacial acetic acid containing iron chloride and with concentrated sulfuric acid, the new acyl derivatives first yield a colorless solution in which, only after a period of several minutes, a characteristic coloration develops. The 1-acetyl-lysergic acid compounds are characterized by a violet-blue coloration, while the 1-acetyl-dihydrolysergic acid compounds give a greenish blue color reaction. With Keller's reagent, the 1-acetoacetyl-lysergic acid derivatives and the 1-acetoacetyl-dihydrolysergic acid derivatives give a green coloration.

The new acyl derivatives of the present invention are stable to dilute acids. On the other hand, when the said acyl derivatives are heated with aqueous sodium carbonate solution or are allowed to stand with alkali, the acyl group is hydrolytically split off. The new products of the invention possess pharmacodynamic properties which are generally similar to those of the corresponding non-acylated lysergic acid derivatives, and can therefore generally be used like the latter. In some cases, improved properties result from the acylation. Thus, the serotonin inhibition action of lysergic acid diethylamide is increased 2½ fold by conversion thereof to the corresponding 1-acetyl derivative according to the present invention, while at the same time the toxicity is decreased to about one-tenth that of the non-acetylated compound. Moreover, while lysergic acid diethylamide results in a temperature increase upon administration of large doses in the rat, this action is entirely lacking in the 1-acetyl-lysergic acid diethylamide which, like Hydergin, has only a temperature lowering action. The new compounds are thus useful as pharmaceutica. They are useful in the treatment of peripheral vascular disease and hypertension as well as psychic disturbances. They may advantageously be administered orally or by intramuscular injection.

Hydergin refers specifically to dihydroergocornine methanesulfonate, dihydroergocristine methanesulfonate and dihydroergocryptine methanesulfonate.

The following examples set forth presently-preferred representative embodiments of the invention. In these examples, the parts and percentages are by weight unless otherwise indicated. The relationship between parts by weight and parts by volume is the same as that between grams and milliliters. Temperatures are in degrees centigrade.

Example 1

A vigorous stream of ketene is passed for a period of 50 minutes through a solution of 0.65 part of D-lysergic acid-methylester in 50 parts by volume of acetone. At the end of this time, the reaction is finished. 300 parts by volume of water are then added to the solution, which is then shaken for 1½ hours. The non-basic precipitate is then separated by filtration, the acylation product set free from the acid solution by means of sodium bicarbonate, and the said product thereupon extracted with chloroform. The chloroform extract is evaporated to dryness and, for purposes of purification, the residue is dissolved in benzene and the solution filtered through a column constituted by 30 parts of aluminum oxide. From the faster moving fractions, 0.21 part of 1-acetyl-lysergic acid-methyl-ester

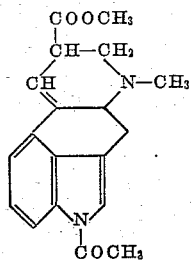

is obtained. This product crystallizes in the form of massive short prisms out of acetone upon dilution with petroleum ether. Melting point=172–173°. $[\alpha]_D^{20} = +15°$ (c=0.5 in chloroform).

Upon further development of the chromatogram with benzene containing 2% of ethanol, the more adherent 1-acetoacetyl-lysergic acid-methylester

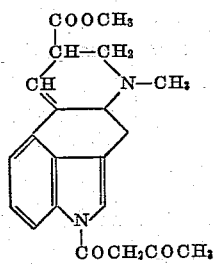

is dissolved out. This compound is recrystallized, by dissolving it in acetone and diluting with petroleum ether, whereupon the compound is obtained as short needles which melt at 168–169°. In the Keller color reaction, the compound gives a yellowish green coloration.

$$[\alpha]_D^{20} = -7.5°$$

(c=0.5 in chloroform).

Example 2

A vigorous stream of ketene is passed for a period of 1 hour through a solution of 2.0 parts of dihydrolysergic acid-methylester in 60 parts by volume of acetone. The reaction mixture is then diluted with 500 parts by volume of water, the mixture shaken for 2 hours, and the precipitated non-basic byproducts separated by filtration. The acylation products are liberated from the acid solution by means of sodium bicarbonate, after which the said products are extracted with chloroform. The chloroform solution is evaporated to dryness and the residue is dissolved in benzene and chromatographed on a column of 90 parts of aluminum oxide.

Upon elution with benzene, the formed 1-acetyl-dihydrolysergic acid-methylester is washed into the filtrate. The latter is evaporated to dryness, and there is thus obtained 0.49 part of crystalline 1-acetyl-dihydrolysergic acid-methylester

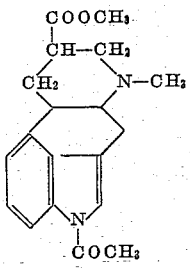

Upon recrystallization from benzene, this product separates in the form of massive prisms which melt at 182–183°. Keller's color reaction: greenish blue.

$$[\alpha]_D^{20} = -98°$$

(c=0.5 in pyridine).

The more adherent 1-acetoacetyl-dihydrolysergic acid-methyl ester

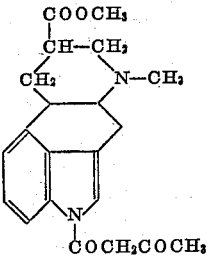

which also formed, is eluted from the chromatogram with chloroform. The filtrate is evaporated to dryness, and the residue (0.61 part) is recrystallized from benzene, whereupon last-named methylester is obtained as crystalline plates which melt at 190–191°. $[\alpha]_D^{20} = -114°$ (c=0.5 in pyridine). Keller's color reaction: green.

Example 3

0.55 part of dihydrolysergic acid-methylester are dissolved in 30 parts by volume of benzene with addition of 0.1 part by volume of aqueous trimethylamine solution of 33% concentration. A vigorous stream of ketene is passed through the resultant solution for a period of 30 minutes. Thereupon the reaction solution is evaporated to dryness under reduced pressure and the residue is chromatographed on 30 parts of aluminum oxide, using benzene as solvent. The filtrate, upon being evaporated to dryness, yields as residue 0.45 part of crystalline 1-acetyl-dihydrolysergic acid-methylester. After recrystallization, there is obtained from benzene 0.30 part of the analytically pure compound having the same properties as the corresponding compound obtained according to the preceding Example.

*Example 4*

A stream of ketene is passed for 30 minutes through a solution of 1.0 part of D-lysergic acid-diethylamide in 30 parts by volume of benzene, following the addition to the solution of 0.1 part by volume of aqueous trimethylamine solution of 33% concentration. The resultant solution is evaporated to sirupy consistency, then diluted with 30 parts by volume of acetone and, after the addition of 500 parts by volume of water and 1.5 parts by volume of glacial acetic acid, shaken for 1 hour. The non-basic byproducts, which precipitate out, are filtered off, after which the formed acetylation product is extracted with chloroform from the acidic aqueous filtrate after alkalization with bicarbonate. The chloroform solution is evaporated to dryness and the residue is dissolved in benzene, and the solution filtered through an aluminum oxide column. From the filtrate, there is obtained 0.47 part of 1-acetyl-lysergic acid-diethylamide

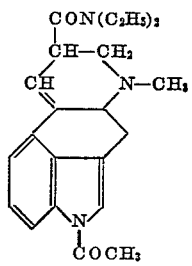

which, as base, does not crystallize. $[\alpha]_D^{20} = -14°$ ($c=0.5$ in pyridine). Keller's color reaction: violet.

The so-obtained compound forms a water-soluble crystalline acid tartrate. The latter is prepared by adding equimolecular quantities of 1-acetyl-lysergic acid-diethylamide and D-tartaric acid to acetone, from which the bitartrate immediately precipitates in the form of fine crystals. Melting point = 178–180°. $[\alpha]_D^{20} = -6°$ ($c=0.5$ in pyridine).

*Example 5*

0.5 part of lysergic acid-monomethylamide is dissolved in 40 parts by volume of absolute benzene, 0.1 part by volume of aqueous trimethylamine solution of 33% concentration is added, and the solution subjected for 10 minutes to the action of a stream of ketene. After working up the reaction mixture as in the preceding examples, 0.6 part of crude product is obtained, which is digested with a small quantity of absolute benzene. The benzene-insoluble fraction is practically pure 1-acetyl-lysergic acid-monoethylamide

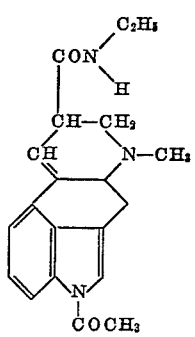

and can be directly recrystallized from acetone or chloroform, whereby the product is obtained in microcrystalline form and has a melting point of 220–223°.

By chromatographing the benzene-soluble fraction on a column of aluminum oxide, a further quantity of the desired 1-acetyl-lysergic acid-monoethylamide can be eluted with benzene $+\frac{1}{2}\%$ of ethanol. Total yield: 0.4 part. Keller's color reaction: after several minutes violet-blue. $[\alpha]_D^{20} = -20°$ ($c=0.4$ in pyridine).

Having thus disclosed the invention, what is claimed is:

1. A process for the preparation of a compound of the formula

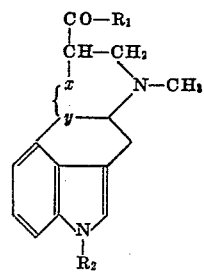

wherein $R_1$ represents a member selected from the group consisting of lower alkoxy, lower monoalkylamino and lower dialkylamino, $R_2$ represents a member selected from the group consisting of —COCH₃ and —COCH₂COCH₃, and

represents a member selected from the group consisting of —CH₂—CH< and —CH=C<, which comprises treating the corresponding compound of the formula

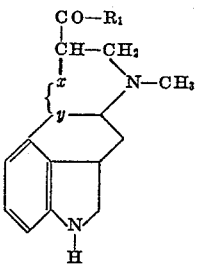

wherein $R_1$ and

have the afore-recited significances with gaseous ketene in a solvent medium.

2. A process according to claim 1, wherein the treatment with the ketene is effected in the presence in the reaction medium of a tertiary base as catalyst.

3. A compound of the formula

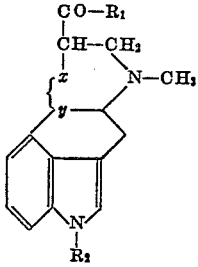

wherein $R_1$ represents a member selected from the group consisting of lower alkoxy, lower monoalkylamino, and lower dialkylamino, $R_2$ represents a member selected from the group consisting of —COCH₃ and

—COCH₂COCH₃, and $$\underset{x \quad y}{}$$

represents a member selected from the group consisting of —CH₂—CH< and —CH=C<.

4. 1-acetyl-lysergic acid-methylester.
5. 1-acetyl-dihydrolysergic acid-methylester.
6. 1-acetoacetylidihydrolysergic acid-methylester.
7. 1-acetyl-lysergic acid-diethylamide.
8. 1-acetyl-lysergic acid-monoethylamide.

References Cited in the file of this patent

FOREIGN PATENTS 499,172   Belgium _____ Mar. 1, 1951

OTHER REFERENCES

Wagner et al.: Synthetic Organic Chem., John Wiley Inc., N. Y. 1953, page 571.

Stoll et al.: Helv. Chim. Acta (1950) pp. 67–75.

Atherton et al.: Chemistry and Industry (1953), pp. 1151–1152.